United States Patent [19]

Berger et al.

[11] Patent Number: 4,726,839
[45] Date of Patent: Feb. 23, 1988

[54] PROCESS AND AN ARRANGEMENT FOR THE PRODUCTION OF STEEL FROM SPONGE IRON

[75] Inventors: Harald Berger; Hermann Pirker, both of Linz, Austria

[73] Assignee: Voest-Alpine Aktiengesellschaft, Austria

[21] Appl. No.: 847,497

[22] Filed: Apr. 4, 1986

[30] Foreign Application Priority Data

Apr. 26, 1985 [AT] Austria ................................. 1257/85

[51] Int. Cl.[4] .............................................. C22B 4/00
[52] U.S. Cl. ......................................... 75/10.1; 75/46; 75/58
[58] Field of Search ............................. 75/10.1, 46, 58

[56] References Cited

U.S. PATENT DOCUMENTS 3,022,157  2/1962  Huntington ............................. 75/46
3,251,679  5/1966  Graef .................................... 75/46

*Primary Examiner*—Peter D. Rosenberg
*Attorney, Agent, or Firm*—Ostrolenk, Faber, Gerb & Soffen

[57] ABSTRACT

A process and an arrangement for the production of steel from sponge iron. In order to be able to process sponge iron with high contents of acid gangue and a phosphorus content of more than 3% in an economic and operationally safe manner, the following measures are taken:

melting the sponge iron charge, if desired, together with scrap, in an acid-lined electric furnace, tapping the steel melt slag-free into a basic-lined ladle by introducing a particulate dephosphorizing agent into the casting jet, removing the phosphorus-containing slag formed from the ladle and subsequently introducing the ladle into a ladle heating stand, in which additional dephosphorizing agent is blown into the melt together with oxygen or oxygen-containing gas, which treatment, if necessary, is repeated after extraction of the formed slag, with the ladle content optionally being heated to adjust the desired dephosphorization temperature of about 1,550° to 1,600° C., and, after desphosphorization has been completed, adjusting the desired steel composition by adding alloying components, such as ferromanganese, killing agents, such as silicon and aluminum, as well as, if necessary, desulphurating agents, such as calcium.

13 Claims, 1 Drawing Figure

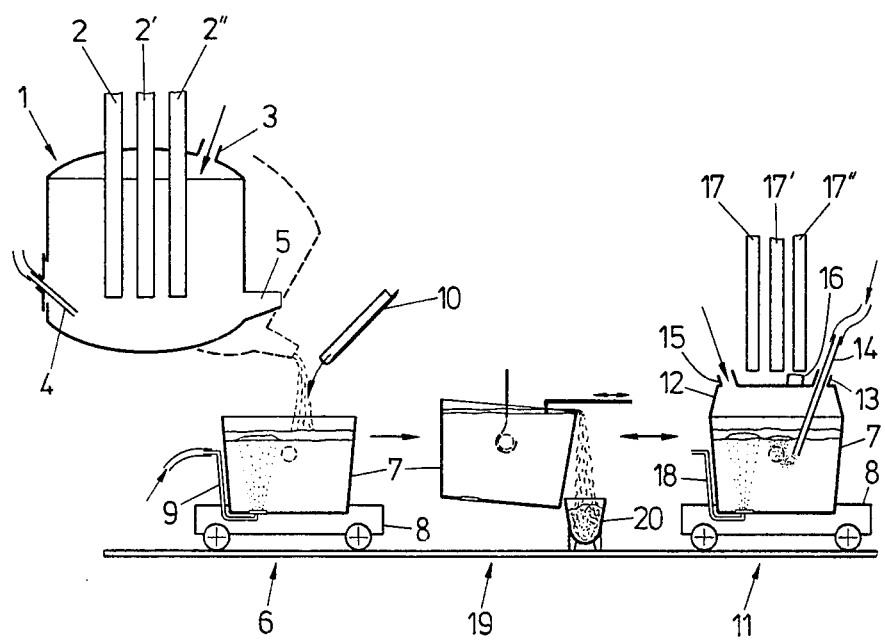

PROCESS AND AN ARRANGEMENT FOR THE PRODUCTION OF STEEL FROM SPONGE IRON

This invention relates to a process for the production of steel from sponge iron having a phosphorus content of more than 0.3%, a content of acid gangue corresponding to an $SiO_2$ content of more than 5% and an $Al_2O_3$ content of more than 3%, as well as a content of basic gangue corresponding to a CaO-MgO content of less than 5%, if desired, upon the addition of iron scrap up to an amount of 30% of the sponge iron charge, as well as to a plant for carrying out the process.

Sponge iron produced by means of the direct reduction process, as a rule, has a carbon content of from 0.20 to 2.40%, a sulfur content of from 0.01 to 0.03% and a phosphorus content of from 0.007 to 0.05%, and in addition, a content of acid gangue corresponding to an $SiO_2$ content of from 2 to 4% and an $Al_2O_3$ content of from 0.60 to 2.70%, as well as a content of basic gangue corresponding to a CaO+MgO content of from 0.20 to 3%. The balance essentially consists of iron and iron oxides.

Sponge iron of such a composition usually is melted in basic-lined melting vessels upon the addition of basic slag formers, with the phosphorus to the major extent being absorbed by the slag and the gangue constituents being retained in the slag, so that the metal melt obtained may be directly processed into steel.

However, there are iron ores that have a much higher content of phosphorus-containing minerals, such as, e.g., apatite. In sponge iron obtained from such ores according to a direct reduction process, there are phosphorus contents of more than 0.3% to 1.2%, $SiO_2$ contents of more than 5%, even up to 7 or 8%, and $Al_2O_3$ contents of more than 3% up to about 6%, the portion of basic gangue material—characterized by CaO+MgO—being less than 5% or even 4%.

So far, it has been impossible or only the least economical to produce useful steel from sponge iron having such a composition, because unacceptably large amounts of basic dephosphorizing agents must be used to eliminate the phosphorus during melting in basic-lined vessels. Melting of such dephosphorizing agents involves a high energy consumption. Likewisely, the charging time is too long, the incurring slag amount is too large and the iron yield is too low. The elimination of phosphorous-containing ore-accompanying substances as well as of acid gangue prior to the direct reduction of the ore actually is possible only with few types of ore, for instance, with magnetitic ores, yet the expenditures involved in treating the ores by grinding and subsequently separating undesired ore constituents are extremely high in any event.

The invention aims at avoiding these disadvantages and has as its object to provide an economic and operationally safe process for the production of steel from the starting materials indicated, which have hitherto not been processable. Sponge iron of this unusual composition is obtained, for instance, from ore deposits that are available in large amounts in the Northern African area and partially have not yet been made accessible, and there is the desire to utilize these deposits on an industrial scale.

The process according to the invention, by which this object is achieved, is characterized by the combination of the following measures:

melting the sponge iron charge, if desired, together with scrap, in an acid-lined electric furnace, tapping the steel melt slag-free into a basic-lined ladle by introducing a particulate dephosphorizing agent into the casting jet, removing the phosphorus-containing slag formed from the ladle and subsequently introducing the ladle into a ladle heating stand, in which additional dephosphorizing agent is blown into the melt together with oxygen or oxygen-containing gas, which treatment, if necessary, is repeated after extraction of the formed slag, with the ladle content optionally being heated to adjust the desired dephosphorization temperature of about 1,550° to 1,600° C., and, after desphosphorization has been completed, adjusting the desired steel composition by adding alloying components, such as ferromanganese, killing agents, such as silicon and aluminum, as well as, if necessary, desulphurating agents, such as calcium.

In this manner, the energy and raw material demands for the production of steel from acid, highly phosphorusand gangue-containing sponge iron can be kept very low.

Suitably, quartz is added commonly with the sponge iron and, if desired, with the scrap.

Sponge iron and quartz sand can be charged into the electric furnace via conveying belts continuously during the melting process. The $SiO_2$ content of the slag formed in the electric furnace favorably may be above 50%, the temperature of the melt is to be kept relatively low (about 1,550° C.) in order to prevent undesired reactions during the melting procedure.

According to one embodiment of the process according to the invention, refining is effected in an electric arc furnace after melting of the sponge iron/scrap charge by blowing oxygen into the melt.

If necessary, refining occurs to a mean C content, according to the C/FeO balance.

Prior to tapping into the ladle, it has proved advantageous to raise the temperature of the melt to about 90° C. above the liquidus point in order to compensate for the thermal losses caused by tapping and dephosphorization.

Part of the acid slag formed in the electric furnace may be left in the furnace when smelting the subsequent charge.

Preferably, the steel melt cast into the ladle is flushed or agitated by argon bottom-blown into the ladle. The blowing in of argon or any other noble gas in this case is effected during tapping and after tapping, in order to make full use of the absorbability of the formed slag with regard to phosporus.

According to an advantageous embodiment, further dephosphorizing agent and/or slag formers are supplied into the ladle in addition to the particulate dephosphorizing agent introduced into the casting jet. These substances may be spread into the ladle or onto the steel melt already prior to tapping.

According to a further embodiment, the ladle in the ladle heating stand is flushed with argon bottom-blown through the melt. Instead of argon, any other noble gas may be used in such a case.

Suitably, further slag formers are charged into the ladle in the ladle heating stand in addition to the dephosphorizing agent blown in with oxygen or oxygen-containing gas, in order to form a top slag covering the metal bath surface.

As the dephosphorizing agent and/or slag former, a mixture containing primarily a CaO-CaCO$_3$ mix, CaF$_2$ and iron oxides is used in the first place.

The plant according to the invention is characterized by an acid-lined electric furnace with a casting spout for the formation of a casting jet, a basic-lined ladle and a ladle heating stand, the ladle being movable between a first dephosphorizing station in the casting jet region and the ladle heating stand.

Suitably, both the first dephosphorizing station and the ladle heating stand are provided with feed means for dephosphorizing agent and for flush gas to be blown into the ladle.

Furthermore, a slagging position suitably is provided between the first dephosphorizing station and the ladle heating stand.

The ratio between the upper diameter of the ladle and its height advantageously is above 0.8.

The invention is explained in more detail by way of the accompanying diagram.

An acid-lined tiltable electric arc furnace, which is generally denoted by 1, comprises the three electrodes 2, 2', 2''. The electric furnace is equipped with a charging opening 3 for the introduction of sponge iron and quartz sand as well as with an oxygen lance 4 suitably led through the furnace door. In the bottom region of the furnace, a casting spout 5 is provided.

Below the casting spout 5, a first dephosphorizing station 6 is provided, where a basic-lined ladle 7 is positioned on a car 8. The ladle is dimensioned to be over-square, i.e., its upper diameter is larger than its height. In addition, the first dephosphorizing station is provided with a feed line 9 for argon and with a chute 10 for the introduction of dephosphorizing agent into the casting jet illustrated in broken lines. The tapping position of the electric arc furnace 1 likewisely is illustrated in broken lines. The feed line 9, in the embodiment illustrated, is connectable to a flushing brick in the bottom of the ladle 7.

Furthermore, the plant comprises a ladle heating stand 11, to which the ladle 7 is movable by means of the car 8. In the ladle heating stand 11, a lid 12 closing the ladle 7 is arranged in a liftable, lowerable and pivotable manner and includes an opening 13 for the introduction of a lance 14. This lance is connected to feedings (not illustrated) for dephosphorizing agent and oxygen or oxygen-containing gas, for instance, air. An opening 15 for charging additional slag formers also is provided in Zthe lid 12. Gases that form can be removed through a gas discharge duct 16. Moreover, the ladle heating stand includes liftable, lowerable and pivotable electrodes 17, 17', 17'' for heating the ladle content, if necessary, as well as an argon feed line 18 for flushing the ladle content.

Between the first dephosphorizing station 6 and the ladle heating stand 11, there is provided a slagging position 19, at which the phosphorus-containing slag formed in the first dephosphorizing station 6 and while residing in the ladle heating stand 11 is extracted from the ladle 7 and ready to be transported away by means of a slag bucket 20. The plant may be equipped with additional means (not illustrated) to conduct away the smoke gas and flue gases forming during the process. Thus, it is possible, e.g., to enclose the electric furnace 1 in a housing commonly with the first dephosphorizing station 6, and to suck off the gases from this housing.

The following example serves to illustrate this invention in more detail.

EXAMPLE 144 tons of sponge iron having the following composition: 78.0% total Fe, 70.0% Fe$_{met}$ (degree of metalliztion: 90%), 1.50% C, 0.02% S, 1.10% P, 7.50% SiO$_2$, 5.20% Al$_2$O$_3$, 4.90% CaO+MgO and traces of Cu, Ni, Cr, Mo, Sn, together with 33.5 tons of works scrap and 11 tons of quartz sand, are charged into a 140 ton electric arc furnace, as illustrated in the drawing, and are smelted at a low cos 4 of about 0.7 until a melt bath temperature of 1,550° C. is reached, wherein it is refined by oxygen blown in.

After a short heating-up phase in which the temperature rises to 1,640° C., the metal melt is tapped slag-free into the ladle 7 being in the first dephosphorizing station 6 by tilting the furnace, a dephosphorizing agent consisting of 57% CaO/CaCO$_3$, 18% CaF$_2$ and 25% Fe$_x$O$_y$ being introduced into the casting jet during tapping in an amount of 20 kg/ton of steel melt. Simultaneously, argon is blown in through the bottom of the ladle 7 in order to produce a vigorous agitation.

The steel melt flowing out of the casting spout 5 of the furnace 1 has a phosphorus content of about 0.8 to 0.9%, phosphorus content of the metal melt remaining in the ladle 7 after the first dephosphorizing procedure amounting to about 0.4 to 0.5%. The temperature of the melt is about 1,570° C. at that time.

Thereupon, the ladle 7 is moved from the first dephosphorizing station 6 into the slagging position 19, is tilted until the overflow of the slag, and the slag is extracted. The temperature of the slag at that time amounts to about 1,560° C.

After slagging, the metal melt contained in the ladle 7 is transferred into the ladle heating stand 11, is heated to about 1,600° C. and is subjected to a second or several further dephosphorization step(s). At these further dephosphorization steps, 20 kg of the already mentioned particulate or powderous dephosphorizing agent per ton of melt are blown in through the lance 14 by means of oxygen or oxygen-containing gas. At the same time, further slag formers of the same composition as the dephosphorizing agent are introduced through the charge opening 15 in an amount of 30 kg/ton of melt.

After having carried out any further desphosphorization step, the ladle 7 is placed into the slagging position 19, the slag is removed, and the ladle is returned to the ladle heating stand 11, where a deoxidation and/or desulphuration treatment as well as the addition of alloying components, such as ferromanganese and/or ferrosilicon, are effected in order to attain the desired steel analysis. 140 tons of steel melt of the following composition were obtained:

0.04% phosphorus
0.3% silicon
0.2% carbon
0.7% manganese
balance iron and impurities caused by melting.

What we claim is:

1. A process for the production of steel from sponge iron having a phosphorus content of more than 0.3%, a contentof acid gangue corresponding to an SiO$_2$ content of more than 5% and an Al$_2$O$_3$ content of more than 3%, as well as a content of basic gauge corresponding to a CaO-MgO content of less than 5%, which method comprises the steps of introducing a sponge iron charge into an electric furnace with acid lining, melting said sponge iron charge in said electric furnace so as to obtain a steel melt, tapping said steel melt slag-free into a basic-lined ladle at a first dephosphorizing station with a particulate dephosphorizing agent being introduced into the casting jet so as to form a phosphorus-containing slag, removing said phosphorus-containing slag from the ladle, moving the ladle into a second dephosphorizing station at a ladle heating stand, blowing further dephosphorizing agent into the steel melt together with one of oxygen and oxygen-containing gas in said ladle heating stand, and, after dephosphorization has been completed, adjusting the desired steel composition by adding alloying components, such as ferromangenese, and killing agents, such as silicon and aluminum.

2. A process as set forth in claim 1, wherein iron scrap up to an amount of 30% of the sponge iron charge is introduced into the electric furnace and melted there, together with said sponge iron charge.

3. A process as set forth in claim 1, wherein the step of blowing further dephosphorizing agent into the melt together with one of oxygen and oxygen-containing gas in the ladle heating stand is repeated after extraction of the formed slag.

4. A process as set forth in claim 1, further comprising the step of heating the content of the ladle in the ladle heating stand so as to adjust the desired dephosphorization temperature of about 1,550° to 1,600° C.

5. A process as set forth in claim 1, further comprising the step of adding desulphurating agents, such as calcium, to adjust the desired steel composition.

6. A process as set forth in claim 1, wherein quartz is introduced together with the sponge iron charge.

7. A process as set forth in claim 2, wherein quartz is introduced together with the sponge iron charge and the iron scrap.

8. A process as set forth in claim 1 or 2, further comprising the step of refining by blowing oxygen into the melt after melting of the sponge iron/iron scrap charge in an electric arc furnace.

9. A process as set forth in claim 1, further comprising the step of flushing and agitating the steel melt cast into the ladle by bottom-blowing argon into the ladle.

10. A process as set forth in claim 1, wherein at least one of further dephosphorizing agent and slag formers are supplied into the ladle in addition to the particulate dephosphorizing agent introduced into the casting jet.

11. A process as set forth in claim 1, further comprising the step of flushing the ladle in the ladle heating stand by bottom-blowing argon through the melt.

12. A process as set forth in claim 10, wherein further slag formers are charged into the ladle in the ladle heating stand in addition to further dephosphorizing agent blown in with one of oxygen and oxygen-containing gas so as to form a top slag covering the steel melt.

13. A process as set forth in claim 1, 3, 10 or 12, wherein said desphosphorizing agents and said slag formers are substantially comprised of a mixture containing a $CaO$-$CaCO_3$ mix, $CaF_2$ and iron oxides.

* * * * *